United States Patent
Spikes et al.

(10) Patent No.: US 9,740,390 B2
(45) Date of Patent: Aug. 22, 2017

(54) DYNAMIC CLIP ANALYSIS

(71) Applicant: Spikes, Inc., Campbell, CA (US)

(72) Inventors: Branden L. Spikes, Saratoga, CA (US); Walter Sims, Saratoga, CA (US)

(73) Assignee: Spikes, Inc., Los Gatos, CA (US)

(*) Notice: Subject to any disclaimer, the term of this patent is extended or adjusted under 35 U.S.C. 154(b) by 116 days.

(21) Appl. No.: 14/205,023

(22) Filed: Mar. 11, 2014

(65) Prior Publication Data
US 2014/0258384 A1    Sep. 11, 2014

Related U.S. Application Data

(60) Provisional application No. 61/775,854, filed on Mar. 11, 2013.

(51) Int. Cl.
*G06F 3/0486* (2013.01)
*G06F 21/56* (2013.01)
*H04L 29/08* (2006.01)
*G06F 9/54* (2006.01)
*H04L 29/06* (2006.01)

(52) U.S. Cl.
CPC ........... *G06F 3/0486* (2013.01); *G06F 9/543* (2013.01); *G06F 21/56* (2013.01); *H04L 67/025* (2013.01); *H04L 63/14* (2013.01)

(58) Field of Classification Search
CPC ....................................................... H04L 67/10
See application file for complete search history.

(56) References Cited

U.S. PATENT DOCUMENTS

| | | | | |
|---|---|---|---|---|
| 7,392,541 B2* | 6/2008 | Largman | ................ | G06F 21/53 726/17 |
| 7,587,594 B1* | 9/2009 | Kavalam | ................ | G06F 21/53 713/167 |
| 8,375,434 B2 | 2/2013 | Cottrell et al. | | |
| 8,997,205 B1 | 3/2015 | Seshadri | | |
| 2005/0138431 A1* | 6/2005 | Harrison | ................ | G06F 21/50 726/4 |

(Continued)

FOREIGN PATENT DOCUMENTS

WO    2013079113    6/2013

OTHER PUBLICATIONS

Office action dated Apr. 20, 2015 for U.S. Appl. No. 14/205,855.
(Continued)

*Primary Examiner* — Backhean Tiv
(74) *Attorney, Agent, or Firm* — Wilson Sonsini Goodrich & Rosati

(57) ABSTRACT

A dynamic clip analysis system for use in a networked server-client system includes: a client including a client-side remote application module configured to analyze content from one or more of a client-side clipboard and a client-side drag and drop utility; and a remote application interactively connected with the client over a network via the client-side remote application module, the remote application including: one or more of a remote clipboard and a remote drag and drop utility; and a client-side remote application module configured to analyze content from one or more of the remote clipboard and the remote drag and drop utility, so as to perform dynamic clip analysis in the server-client system.

18 Claims, 2 Drawing Sheets

(56) References Cited

U.S. PATENT DOCUMENTS

| | | | |
|---|---|---|---|
| 2005/0149726 A1* | 7/2005 | Joshi | G06F 21/51 713/164 |
| 2005/0273850 A1 | 12/2005 | Freund | |
| 2007/0244987 A1* | 10/2007 | Pedersen | H04L 63/0272 709/217 |
| 2008/0016339 A1 | 1/2008 | Shukla | |
| 2008/0148403 A1* | 6/2008 | Manion | G06F 21/56 726/22 |
| 2008/0263135 A1 | 10/2008 | Olliphant | |
| 2008/0273850 A1 | 11/2008 | Imamura | |
| 2008/0301562 A1 | 12/2008 | Berger et al. | |
| 2008/0320594 A1* | 12/2008 | Jiang | G06F 21/566 726/24 |
| 2009/0254572 A1* | 10/2009 | Redlich | G06Q 10/06 |
| 2009/0282485 A1* | 11/2009 | Bennett | G06F 21/51 726/24 |
| 2009/0287653 A1* | 11/2009 | Bennett | G06F 17/30864 |
| 2009/0293126 A1* | 11/2009 | Archer | G06F 21/562 726/24 |
| 2010/0138639 A1* | 6/2010 | Shah | G06F 21/53 712/227 |
| 2010/0153968 A1* | 6/2010 | Engel | G06F 9/543 719/313 |
| 2010/0178953 A1* | 7/2010 | Blewett | H04L 12/5895 455/550.1 |
| 2010/0250497 A1* | 9/2010 | Redlich | F41H 13/00 707/661 |
| 2011/0016530 A1* | 1/2011 | Fossen | G06F 21/564 726/24 |
| 2011/0078794 A1* | 3/2011 | Manni | G06F 21/566 726/23 |
| 2011/0154492 A1* | 6/2011 | Jeong | H04L 63/1416 726/23 |
| 2012/0150819 A1 | 6/2012 | Lindahl et al. | |
| 2012/0210333 A1 | 8/2012 | Potter et al. | |
| 2012/0210423 A1* | 8/2012 | Friedrichs | H04L 63/1416 726/22 |
| 2013/0283112 A1* | 10/2013 | Orzell | H04H 60/33 714/746 |
| 2014/0259171 A1* | 9/2014 | Spikes | H04L 63/1441 726/23 |
| 2014/0283071 A1* | 9/2014 | Spikes | H04L 63/1441 726/23 |
| 2015/0207850 A1* | 7/2015 | Jitkoff | H04L 67/06 715/748 |
| 2016/0191546 A1* | 6/2016 | Spikes | H04L 63/1441 726/23 |

OTHER PUBLICATIONS

Office action dated Nov. 18, 2015 for U.S. Appl. No. 14/205,855.
Office action dated Apr. 8, 2016 for U.S. Appl. No. 14/205,855.
Office action dated Jan. 26, 2017 for U.S. Appl. No. 14/794,652.

* cited by examiner

DYNAMIC CLIP ANALYSIS

PRIORITY CLAIM

The present application claims the priority benefit of U.S. provisional patent application No. 61/775,854 filed Mar. 11, 2013 and entitled "Dynamic Clip Analysis," the disclosure of which is incorporated herein by reference.

CROSS-REFERENCE TO RELATED APPLICATIONS

This application contains subject matter that is related to the subject matter of the following applications, which are assigned to the same assignee as this application. The below-listed U.S. Patent applications are hereby incorporated herein by reference in their entirety:
"TUNABLE INTRUSION PREVENTION WITH FORENSIC ANALYSIS," by Spikes and Sims, co-filed herewith.
"APPLICATION MALWARE ISOLATION VIA HARDWARE SEPARATION," by Spikes, to be filed on Mar. 12, 2014, to claim the priority benefit of U.S. provisional patent application No. 61/777,545 filed Mar. 12, 2013 and entitled "Application Malware Isolation Via Hardware Separation."

SUMMARY

DETAILED DESCRIPTION

Figure 1:
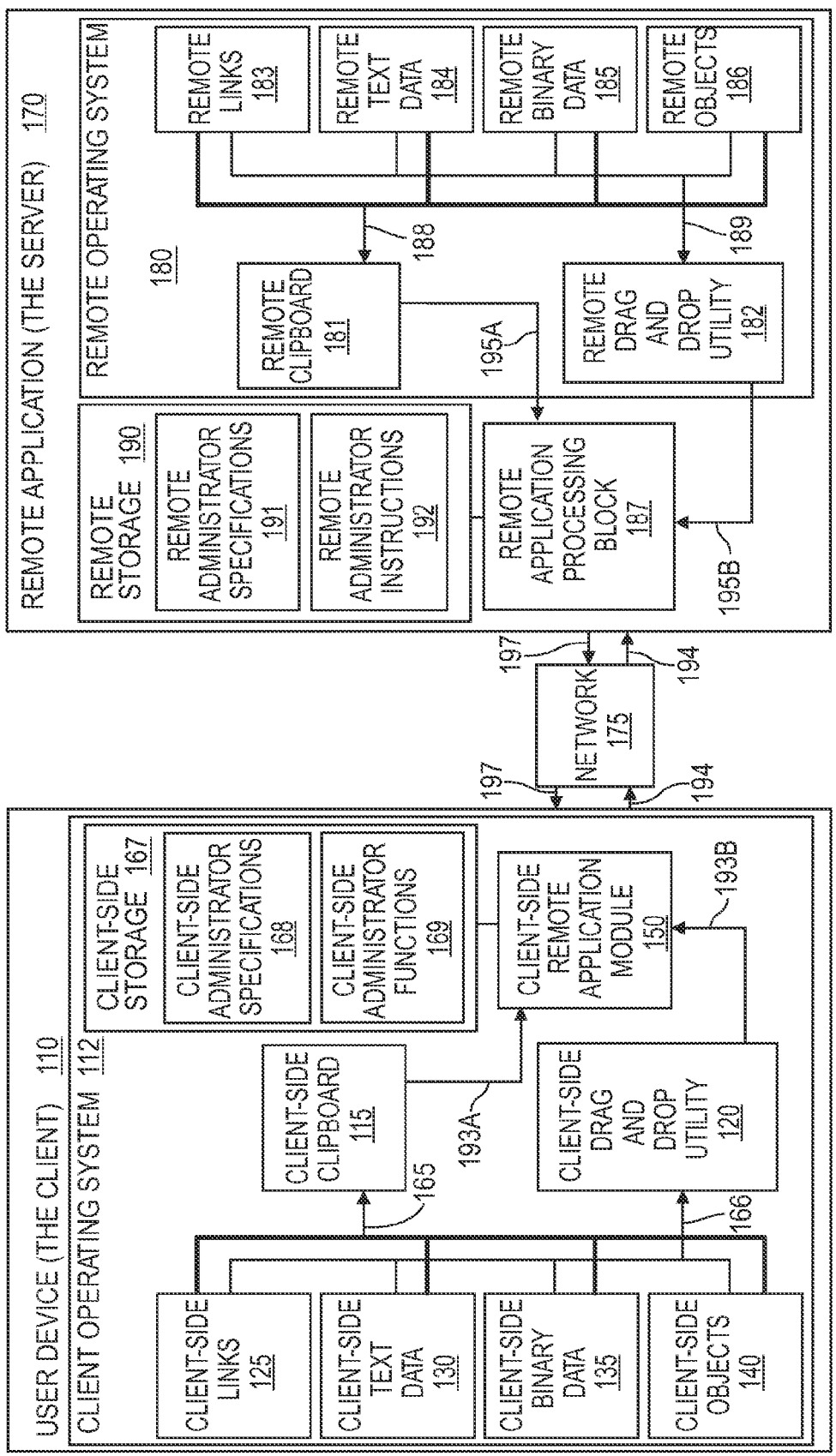
FIG. 1 is a conceptual block diagram showing an exemplary embodiment of a dynamic clip analysis system for use in a networked server-client system.

The clipboard is a software utility that can be used for short-term data storage and/or data transfer between documents or applications, via copy and paste operations. Similarly, drag and drop is a software utility that can be performed on objects to transfer data between documents or applications. These two utilities are most commonly part of a graphical user interface (GUI) environment. The clipboard and drag and drop can typically be accessed via defined programming interfaces from most or all programs within the environment.

An operating system may comprise one clipboard. An operating system may comprise multiple clipboards. An operating system may comprise one drag and drop utility. An operating system may comprise multiple drag and drop utilities. A typical application accesses clipboard functionality by mapping to these interfaces client input such as one or more of key bindings, menu selections, and the like. A typical application may access drag and drop by touch-dragging movements. Alternatively, or additionally, a typical application may access drag and drop via a series of sequential interactions by one or more of a mouse, a glide pad, and an analogous device. For example, one typical series of sequential interactions that may access drag and drop is a click, a hold, a drag, and a release. The data contained within a clipboard or within a drag and drop can take many forms, with varying degrees of risk of malicious software, also known as malware. If unchecked, these facilities can be used to transmit malware through the browser link. In addition, user interfaces for a clipboard and for drag and drop are not necessarily designed to provide the optimum controls, feedback, and performance when one or more of these two utilities is used over network links.

Clipboards are traditionally comprised in a single computer and share memory space, so copy and paste functions are substantially instantaneous. Remote clipboards may suffer from time delays due to network latency, which may create confusion for clients expecting instant access to clipboard data. Many existing virtual desktop infrastructures (VDI's) and remote application systems permit the use of a clipboard over a network. Typically such systems do not provider a client with feedback about the time that may be required for transmission of large amounts of data. According to embodiments of the invention, if a client tries to cut and paste 2 gigabytes (GB) of data over a network, the client will be informed regarding the expected transfer time. According to embodiments of the invention, a balloon may pop up to provide the client with an indication of the status of the data transfer and the estimated time to complete the transfer.

According to embodiments of the invention, if a client is pasting from the clipboard or is dragging and dropping an object, the remote operating system may analyze which data type is in the clipboard and may process the data. According to other embodiments of the invention, the remote operating system may securely apply the action that is most appropriate for that data. According to embodiments of the invention, the remote operating system may access a table comprising one or more of data types and mechanisms for processing the data. According to embodiments of the invention, the mechanisms for processing the data may comprise scrubbing the data to cleanse any malicious content. According to embodiments of the invention, data that is not cleanly processed or that is forbidden by the policy set by the client may not be allowed permission to be copied to the clipboard or to be pasted over the network. According to yet other embodiments of the invention, the analyzed and processed data may be transmitted to the client.

Examples of supported clipboard data types may include, but are not limited to one or more of text content, image content, video content, word processing content, presentation content, spreadsheet content, zip content, text Hypertext Markup Language (HTML) content, Portable Document Format (PDF) content, and other content of interest.

For example, image content comprises one or more of Joint Photographic Experts Group (JPEG) content, graphic interchange format (GIF) content, Portable Network Graphics (PNG) content, and other image content.

For example, video content comprises one or more of Flash Video File (FLV) content, Motion Picture Experts Group (MPG) video content, Motion Picture Experts Group 4 (MP4) video content, Windows Media Video (WMV) content, and other video content.

For example, word processing content comprises one or more of Microsoft Word content, WordPerfect content, Apple Pages content, Google Docs content, Ted content, and other word processing content.

For example, presentation content comprises one or more of Microsoft Power Point content, Corel Presentations content, Apple Keynote content, Lotus Freelance Graphics content, and other presentation content.

For example, spreadsheet content comprises one or more of Microsoft Excel content, Quattro Pro content, Apple Numbers content, Lotus 1-2-3 content, and other spreadsheet content. According to embodiments of the invention, if the remote operating system identifies the data as text data, any potential binary data may be stripped out.

According to other embodiments of the invention, if after analyzing and processing the received data, the remote operating system identifies the received data as valid content, the remote operating system re-encodes the received data while excluding potentially malicious data. According to still other embodiments of the invention, the processing comprises excluding potentially malicious data, for example, a potentially corrupted image.

If the remote operating system determines that the data does not match a supported data type, the remote operating system denies permission to the non-supported data. If the remote operating system determines that the data is not consistent with one or more of remote administrator specifications that may be provided by the client and remote administrator instructions that may be provided by the client, the remote operating system denies permission to the non-supported data.

According to embodiments of the invention, after the data is analyzed, processed and scrubbed, the scrubbed data may be sent to the client. According to embodiments of the invention, feedback and control systems may perform one or more of showing the progress of the network transfer, allowing the client to cancel the process, showing an estimated transfer time, and the like. According to embodiments of the invention, duplicate transfer operations may be detected and stopped so as to conserve bandwidth.

FIG. 1 is a conceptual block diagram showing an exemplary embodiment 100 of a dynamic clip analysis system for use in a networked server-client system. Depicted is a server-client system 100 where the client 110 is a client device 110. For example, the client device 110 may be one or more of a personal computer, a laptop computer, a mobile computing device, a tablet, and the like.

The client 110 may comprise a client operating system 112. The client operating system 112 may comprise one or more of a client-side clipboard 115 and a client-side drag and drop utility 120. The client operating system 112 may also comprise data in various formats. For example, the client operating system 112 may comprise one or more of client-side links 125, client-side text data 130, client-side binary data 135, client-side objects 140, a client-side remote application module 150, and another data format 155. The other data format 155 may comprise one or more of an HTML object, an Object Linking and Embedding (OLE) object, hexadecimal data, and another data format. The client 110 may also comprise a client-side remote application module 150.

One or more of the client-side links 125, the client-side text data 130, the client-side binary data 135, and the client-side objects 140 may transfer data to the client-side clipboard 115 via a client-side copy action 165, and a client-side remote application module 150. One or more of the client-side links 125, the client-side text data 130, the client-side binary data 135, and the client-side objects 140 may transfer data to the client-side drag and drop utility 120 via a client-side drag and drop action 166.

The client operating system 112 may additionally comprise client-side storage 167. The client-side storage 167 comprises one or more of client-side administrator specifications 168 and client-side administrator functions 169. The client-side storage 167 is operably connected with the client-side remote application module 150.

For example, the client-side administrator specifications 168 may comprise a configurable list of one or more types of client-side data content. For example, the client-side administrator functions 169 may comprise an appropriate action to take on one or more types of client-side data content. For example, one or more of the client-side administrator specifications 168 and the client-side administrator functions 169 may comprise one or more tables configured to provide instructions as to the one or more appropriate actions for the client-side data.

One or more of the client-side administrator specifications and the client-side administrator functions may comprise client Intrusion Detector & Preventer (IDP) (IDP) rules.

The client 110 may use one or more of the client-side administrator specifications 168 and the client-side administrator functions 169 to specify desired limitations on content that is to be allowed permission by the system 100. For example, the client 110 may specify via client-side administrator specifications 168 that all JPEG content is to be blocked. For example, the client 110 may specify via client-side administrator functions 169 that all PNG content arriving from a particular remote application is to be permitted but with a notice to be transmitted to the client 110 each time it is transmitted. For example, the client 110 may specify via client-side administrator specifications 168 that all PDF content comprising more than 100 kilobytes is to be permitted.

For example, the client-side administrator specifications 168 may direct different processing for different client-side content type(s). For example, the client-side administrator specifications 168 may direct that the client-side image content scrubbed in order to cleanse it. For example, the client-side administrator specifications 168 may direct that the remote sound content be normalized and re-encoded into a Motion Picture Experts Group Audio Layer III (MP3) format in order to cleanse it.

For example, the client-side administrator functions 168 may direct that in the event the client-side image content cannot be re-encoded in order to cleanse it, an anti-virus scan should be performed on the client-side image content. For example, the client-side administrator functions 168 may direct that in the event the client-side sound content cannot be normalized and re-encoded into the MP3 format in order to cleanse it, that the client-side sound content be normalized and re-encoded into the Waveform Audio File (WAV) format in order to cleanse it. For example, the client-side administrator functions 168 may direct that in the event the client-side sound content cannot be normalized and re-encoded into the MP3 format and cannot be normalized and re-encoded into the WAV format in order to cleanse it, an anti-virus scan should be performed on the client-side audio content.

The system 100 also comprises a remote application 170. The remote application 170 may be interactively connected to the client 110 over a network 175 via the client-side remote application module 150. Typically, the client-side clipboard 115 and the client-side drag and drop utility 120 are used on a local device only. Embodiments of the invention provide these functions with advances in security relative to a network 175, which may be slow.

The remote application 170 may comprise a remote operating system 180. The remote operating system 180 may comprise one or more of a remote clipboard 181 and a remote drag and drop utility 182 provided by its operating system. The remote operating system 180 may also comprise one or more of remote links 185, remote text data 184, remote binary data 185, and remote objects 186. The remote application 170 may also comprise a remote application processing block 187. The remote application processing block 187 can, as depicted in FIG. 1, be separate from the remote operating system 180. The remote application processing block 187 can alternatively be comprised in the remote operating system 180.

One or more of the remote links 185, the remote text data 184, the remote binary data 185, and the remote objects 186 may transfer data to the remote clipboard 181 via a remote clipboard action 188. One or more of the remote links 185, the remote text data 184, the remote binary data 185, and the remote objects 186 may transfer data to the remote drag and drop utility 184 via a remote drag and drop action 189.

The remote application 170 may additionally comprise remote storage 190. The remote storage 190 can, as depicted in FIG. 1, be separate from the remote operating system 180. If the remote storage 190 is separate from the remote operating system 180, the remote storage 190 can, as depicted in FIG. 1, be comprised in the remote application 170. Alternatively, the remote storage 190 can be comprised in a separate server (not shown), connect by another network connection (not shown) to the remote application 106. The remote storage 190 can alternatively be comprised in the remote operating system 180. Regardless of where it is located, the remote storage 190 is operably connected with the remote application processing block 187.

The remote storage 190 comprises one or more of remote administrator specifications 191 and remote administrator instructions 192. For example, the remote administrator specifications 191 may comprise a configurable list of one or more types of remote data content. For example, the remote administrator instructions 192 may comprise an appropriate action to take on one or more types of remote data content. For example, one or more of the remote administrator specifications 191 and the remote administrator instructions 192 may comprise one or more tables configured to provide instructions as to the one or more appropriate actions for the remote data.

The remote application 170 may use one or more of the remote administrator specifications 191 and the remote administrator instructions 192 to specify desired limitations on content that is to be allowed permission by the system 100. For example, the client 110 may specify via remote administrator specifications 191 that all JPEG content is to be blocked. For example, the client 110 may specify via remote administrator instructions 192 that all PNG content arriving from a particular remote application is to be permitted but with a notice to be transmitted to the client 110 each time it is transmitted. For example, the client 110 may specify via remote administrator specifications 191 that all PDF content comprising more than 100 kilobytes is to be permitted.

For example, the remote administrator specifications 191 may direct different processing for different remote content type(s). For example, the remote administrator specifications 191 may direct that the remote image content be scrubbed in order to cleanse it. For example, the remote administrator specifications 191 may direct that the remote sound content be normalized and re-encoded into an MP3 format in order to cleanse it.

For example, the remote administrator instructions 192 may direct that in the event the remote image content cannot be re-encoded in order to cleanse it, an anti-virus scan should be performed on the remote image content. For example, the remote administrator instructions 192 may direct that in the event the remote sound content cannot be normalized and re-encoded into the MP3 format in order to cleanse it, that the remote sound content be normalized and re-encoded into the Waveform Audio File (WAV) format in order to cleanse it. For example, the remote administrator instructions 192 may direct that in the event the remote sound content cannot be normalized and re-encoded into the MP3 format and cannot be normalized and re-encoded into the WAV format in order to cleanse it, an anti-virus scan should be performed on the remote audio content.

The flow of data may occur from the client 110 to the remote application 170. Alternatively, or additionally, the flow of data may occur from the remote application 170 to the client 110.

At the client 110, the client-side remote application module 150 initiates a client-side clipboard transfer action 193A. The client-side clipboard transfer action 193A transfers data from the client-side clipboard 115 to the client-side remote application module 150.

Alternatively, or additionally, at the client 110, the client-side remote application module 150 initiates the client-side drag and drop transfer action 193B. The client-side drag and drop transfer action 193B transfers data from the client-side drag and drop utility 120 to the client-side remote application module 150.

At the client 110, un-cleansed client data may be transmitted via a client-to-remote application transfer action 194 from the client-side remote application module 150 via the network 175 to the remote application processing block 187.

At the remote application 170, in response to the client-to-remote application transfer action 194, the remote application processing block 187 initiates a corresponding remote clipboard transfer action 195A. The corresponding remote clipboard transfer action 195A transfers data corresponding to the client-side clipboard transfer action 193A from the remote clipboard 181 to the remote application processing block 187.

Alternatively, or additionally, at the remote application 170, in response to the client-to-remote application transfer action 194, the remote application processing block 187 initiates a corresponding remote drag and drop transfer action 195B. The corresponding remote drag and drop transfer action 195B transfers data corresponding to the client-side drag and drop transfer action 193B from the remote drag and drop utility 182 to the remote application processing block 187.

The remote application processing block 187 analyzes the remote data received in the client-to-remote application transfer action 194. The remote application processing block 187 also analyzes the remote data received from the remote clipboard 181 in the remote clipboard transfer action 195A. Alternatively, or additionally, the remote application processing block 187 analyzes the remote data received in the remote drag and drop transfer action 195B. For example, the remote application processing block 187 determines whether the received client-side data comprises one or more of client-side text content, client-side image content, client-side video content, client-side word processing content, client-side presentation content, client-side spreadsheet content, client-side zip content, client-side text HTML content, client-side PDF content, and other client-side content of interest. For example, client-side image content comprises one or more of client-side JPEG content, client-side GIF content, client-side PNG content, and other client-side image content.

After analyzing the remote data received in one or more of the remote clipboard transfer action 195A and the remote drag and drop transfer action 195B, the remote application processing block 187 processes the remote data.

Optionally, the remote application processing block 187 accesses one or more of remote administrator specifications 191 and remote administrator instructions 192, which the remote application processing block 187 applies to determine the most appropriate methods for processing the remote data.

As noted above, one or more of the remote administrator specifications 191 and the remote administrator instructions 192 may comprise one or more tables configured to provide instructions as to processing the remote data. The processing of the remote data by the remote application processing block 187 may comprise scrubbing the remote data of potentially malicious content, for example, malware. The processing of the remote data by the remote application processing block 187 may comprise blocking the remote data based on one or more of remote administrator specifications 191 and remote administrator instructions 192. As noted above, for example, remote administrator specifications 191 may specify that all JPEG content is to be blocked. The processing of the remote data may comprise applying security mechanisms configured to scrub the remote content of potentially malicious content, for example, malware.

Following the processing, the remote application processing block 187 re-encodes the remote data, which is now free of potentially malicious data and is also compliant with one or more of the remote administrator specifications 191 and the remote administrator instructions 192. The remote application processing block 187 then transmits the processed, re-encoded data to the client 110 via the remote application-to-client transfer action 197.

The remote application processing block 187 also can perform feedback and control functions. The feedback and control functions performed by the remote application processing block 187 may be directed in part or in whole by one or more of the remote administrator specifications 191 and the remote administrator instructions 192. The feedback and control functions performed by the remote application processing block 187 may comprise one or more of showing the progress of a client to remote application transfer action 194, showing the progress of a remote application to client transfer action 197, allowing the client 110 to cancel the process, showing an estimated transfer time of a client to remote application transfer action 194, showing an estimated transfer time of a remote application to client transfer action 197, and de-duplication measures to prevent duplicate transmissions.

After determining the remote data received in one or more of the remote clipboard transfer action 195A and the remote drag and drop transfer action 195B, the remote application processing block 187 optionally consults one or more of remote administrator specifications 191 and remote administrator instructions 192 to obtain input on how to process the remote data.

Following the processing, the remote application processing block 187 re-encodes the remote data, which is now free of potentially malicious data and is also compliant with one or more of remote administrator specifications 191 and remote administrator instructions 192. The remote application processing block 187 then transmits the processed, re-encoded data via a remote application-to-client transfer action 197 from the remote application processing block 187 via the network 175 to the client-side remote application module 150.

The client-side remote application module 150 also can perform feedback and control functions. The feedback and control functions performed by the client-side remote application module 150 may be directed in part or in whole by one or more of the client-side administrator specifications 168 and the remote administrator functions 169. The feedback and control functions performed by the client-side remote application module 150 may comprise one or more of showing the progress of a client to remote application transfer action 194, showing the progress of a remote application to client transfer action 197, allowing the client 110 to cancel the process, showing an estimated transfer time of a client to remote application transfer action 194, showing an estimated transfer time of a remote application to client transfer action 197, and de-duplication measures to prevent duplicate transmissions.

After analyzing the remote data received in one or more of the remote clipboard transfer action 195A and the remote drag and drop transfer action 195B, the remote application processing block 187 optionally consults one or more of the remote administrator specifications 191 and the remote administrator instructions 192 to obtain input on how to process the received remote data.

At the client 110, the client-side remote application module 150 analyzes the remote-side data received in the remote application-to-client transfer action 197. The client-side remote application module 150 also analyzes the client-side data from the client-side clipboard 115 in the client-side clipboard transfer action 193A. Alternatively, or additionally, the client-side remote application module 150 analyzes the type(s) of data in the client-side drag and drop transfer action 193B. For example, the client-side remote application module 150 determines whether the client-side data comprises one or more of client-side text content, client-side image content, client-side video content, client-side word processing content, client-side presentation content, client-side spreadsheet content, client-side zip content, client-side text HTML content, client-side PDF content, and other client-side content of interest. For example, client-side image content comprises one or more of client-side JPEG content, client-side GIF content, client-side PNG content, and other client-side image content.

After analyzing the client-side data received in one or more of the client-side clipboard transfer action 193A and the client-side drag and drop transfer action 193B, the client-side remote application module 150 processes the client-side data.

Optionally, the client-side remote application module 150 accesses one or more of client-side administrator specifications 168 and client-side administrator functions 169, which the client-side remote application module 150 applies to determine the most appropriate methods for processing the client-side data.

As noted above, one or more of the client-side administrator specifications 168 and the client-side administrator functions 169 may comprise one or more tables configured to provide instructions as to processing the client-side data. The processing of the client-side data by the client-side remote application module 150 may comprise scrubbing the client-side data of potentially malicious content, for example, malware. The processing of the client-side data by the client-side remote application module 150 may comprise blocking the client-side data based on one or more of client-side administrator specifications 168 and client-side administrator functions 169. As noted above, for example, client-side administrator specifications 168 may specify that all JPEG content is to be blocked. The processing of the client-side data may comprise applying security mechanisms configured to scrub the client-side content of potentially malicious content, for example, malware.

Following the processing, the client-side remote application module 150 re-encodes the client-side data, which is now free of potentially malicious data and is also compliant with one or more of client-side administrator specifications 168 and client-side administrator functions 169. The client-side remote application module 150 then transmits the processed, re-encoded data to the client 110 via the remote application-to-client transfer action 197.

After analyzing the client-side data received in one or more of the client-side clipboard transfer action 193A and the client-side drag and drop transfer action 193B, the client-side remote application module 150 optionally consults one or more of the client-side administrator specifications 168 and the client-side administrator functions 169 to obtain input on how to process the client-side content type(s).

Figure 2:
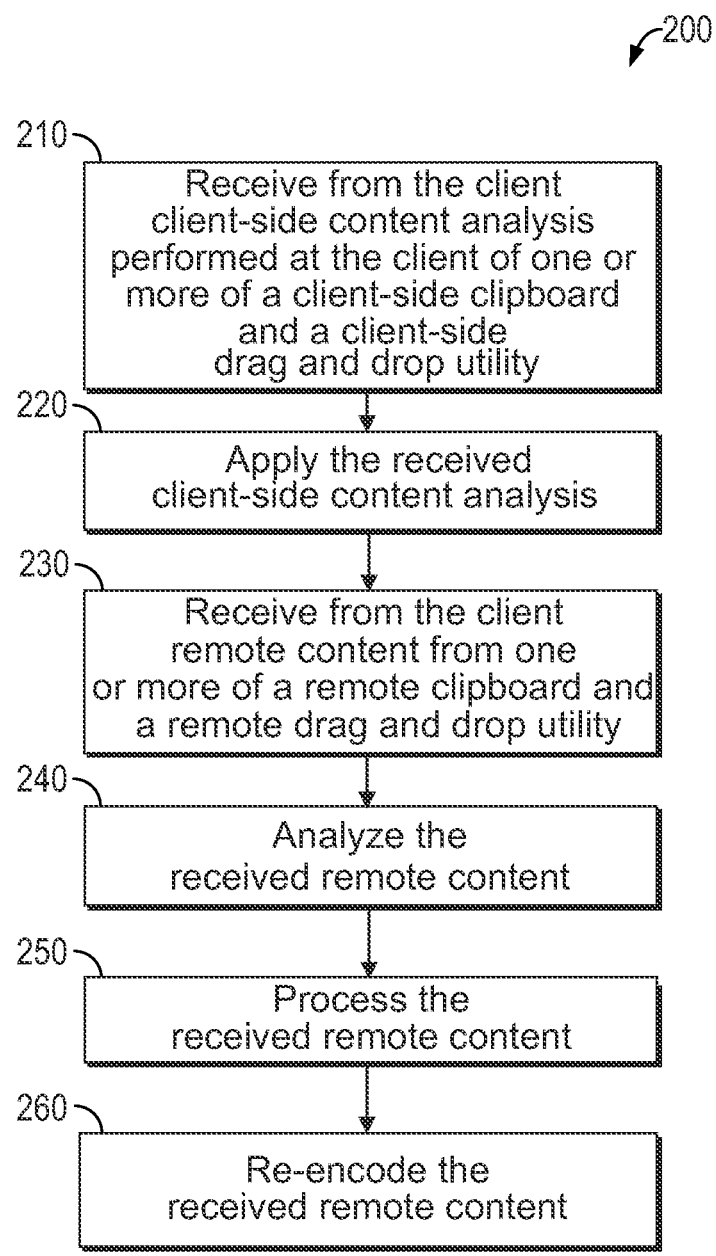
FIG. 2 is a flowchart of a method for dynamic clip analysis in a networked server-client system.

FIG. 2 is a flowchart of a method 200 for dynamic clip analysis in a networked server-client system. The order of the steps in the method 200 is not constrained to that shown in FIG. 2 nor is it constrained to that described in the following discussion. Several of the steps could occur in a different order without affecting the final result.

In block 210, the remote application receives from the client client-side content analysis performed at the client of one or more of a client-side clipboard and a client-side drag and drop utility. Block 210 then transfers control to block 220.

In block 220, the remote application applies the received client-side content analysis. Block 220 then transfers control to block 230.

In block 230, the remote application receives remote content from one or more of a remote clipboard and a remote drag and drop utility. Block 230 then transfers control to block 240.

In block 240, the remote application analyzes the remote content. Block 240 then transfers control to block 250.

In block 250, the remote application processes the remote content. Block 250 then transfers control to block 260.

In block 260, the remote application re-encodes the remote content. Block 260 then terminates the process.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain fabrication steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A dynamic clip analysis system for use in a networked server device-client device system providing remote processing of content potentially containing malware or malicious content, comprising:
a client device comprising a client-side remote application module that analyzes clips of client-side content that potentially contain malware or malicious content in response to one or more of a client-side clipboard and a client-side drag and drop utility, thereby dynamically analyzing clips of client-side content; and
a server device comprising a remote application, the server device interactively connected with the client device over a network, the remote application comprising:
one or more of a remote clipboard and a remote drag and drop utility; and
a remote application processing block on the server device that receives and applies the client-side content analysis, wherein the client-side content analysis is generated at the client device prior to being received at the remote application, that analyzes clips of remote content potentially containing malware from one or more of the remote clipboard and the remote drag and drop utility, and that performs one or more of processing the remote content and re-encoding the remote content according to client-side administrator functions,
so as to process clips of remote content based on client-side content analysis in an isolated manner on the server device to protect the client device from potential malware or malicious content.

2. The system of claim 1, wherein the client-side remote application module transmits un-cleansed client data via the network from the client device to the remote application processing block on the server device.

3. The system of claim 2, wherein the remote application processing block receives the un-cleansed client data, processes the un-cleansed client data, and re-encodes the un-cleansed client data as cleansed client data.

4. The system of claim 3, wherein the remote application processing block further transmits the cleansed client data via the network from the server device to the client-side remote application module on the client device.

5. The system of claim 1, wherein the remote application further comprises remote storage.

6. The system of claim 5, wherein the remote storage comprises one or more of remote administrator specifications and remote administrator instructions to provide the remote application processing block with input on how to process the received remote content.

7. The system of claim 1, wherein the client device further comprises client-side storage.

8. The system of claim 7, wherein the client-side storage comprises one or more of client-side administrator specifications and client-side administrator functions to provide the client-side remote application module with input on how to process the received client-side content.

9. The system of claim 1, wherein the remote application processing block further performs a remote clipboard transfer action from the remote clipboard to the remote application processing block, wherein the remote clipboard transfer action corresponds to a client-side clipboard transfer action from the client-side clipboard to the client-side remote application module.

10. The system of claim 1, wherein the remote application processing block further performs a remote drag and drop transfer action from the remote drag and drop utility to the remote application processing block, wherein the remote drag and drop transfer action corresponds to a client-side drag and drop transfer action from the client-side drag and drop utility to the client-side remote application module.

11. The system of claim 1, wherein processing the remote content comprises scrubbing the content.

12. A dynamic clip analysis method for use in a networked server device-client device system providing remote processing of content potentially containing malware or malicious content, comprising the steps of:

receiving from a client device, by a remote application on a server device, analysis of clips of client-side content that potentially contain malware or malicious content, wherein the analysis is performed at the client device in response to one or more of a client-side clipboard and a client-side drag and drop utility, wherein the client-side content analysis of clips of client-side content is performed at the client device prior to being received by the remote application on the server device;

applying, by the remote application on the server device, the received analysis of clips of client-side content that potentially contain malware or malicious content;

receiving, by the remote application on the server device, remote content from one or more of a remote clipboard and a remote drag and drop utility;

analyzing, by the remote application on the server device, the received remote content;

processing, by the remote application on the server device, the received remote content according to client-side administrator functions; and re-encoding, by the remote application on the server device, the received remote content, so as to process clips of remote content based on client-side content analysis in an isolated manner on the server device to protect the client device from potential malware or malicious content.

13. The method of claim 12, further comprising the step of: receiving from the client device, by the remote application on the server device, un-cleansed client data transmitted by the client device.

14. The method of claim 13, further comprising the steps of:

receiving, by the remote application on the server device, the un-cleansed client data;

processing, by the remote application on the server device, the un-cleansed client data; and re-encoding, by the remote application on the server device, the un-cleansed client data as cleansed client data.

15. The method of claim 14, further comprising the step of:

transmitting, by the remote application, the cleansed client data via the network from the server device to the client device.

16. The method of claim 12, wherein the step of processing comprises scrubbing the remote content.

17. The method of claim 12, wherein the step of processing comprises consulting one or more of remote administrator specifications and remote administrator instructions to obtain input on how to process the received remote content.

18. A dynamic clip analysis system for use in a networked server device-client device system providing remote processing of content potentially containing malware or malicious content, comprising:

a client device comprising a client-side remote application module that analyzes clips of client-side content that potentially contain malware or malicious content in response to one or more of a client-side clipboard and a client-side drag and drop utility, thereby dynamically analyzing clips of client-side content; and a server device comprising a remote application, the server device interactively connected with the client device over a network via the client-side remote application module, the remote application comprising:

one or more of a remote clipboard and a remote drag and drop utility;

remote storage on the server device, the remote storage comprising one or more of remote administrator specifications and remote administrator instructions to provide a remote application processing block with input on how to process the received remote content; and a remote application processing block on the server device that receives and applies client-side content analysis from the client device, wherein the client-side content analysis is generated at the client device prior to being received at the remote application, wherein the remote application processing block on the server device further analyzes clips of remote content potentially containing malware from one or more of the remote clipboard and the remote drag and drop utility, wherein the remote application processing block on the server device further performs one or more of processing the remote content and re-encoding the remote content, and wherein the remote application processing block on the server device further receives un-cleansed client data via the network from the client device, processes the un-cleansed client data according to client-side administrator functions, re-encodes the un-cleansed client data as cleansed client data, and transmits the cleansed client data via the network from the server device to the client-side remote application module on the client device, so as to process clips of remote content based on client-side content analysis in an isolated manner on the server device to protect the client device from potential malware or malicious content.

\* \* \* \* \*